Feb. 14, 1950　　　F. P. FLETCHER　　　2,497,121
BICYCLE CONSTRUCTION
Filed June 19, 1944　　　　　　　　　　　　　　2 Sheets-Sheet 2
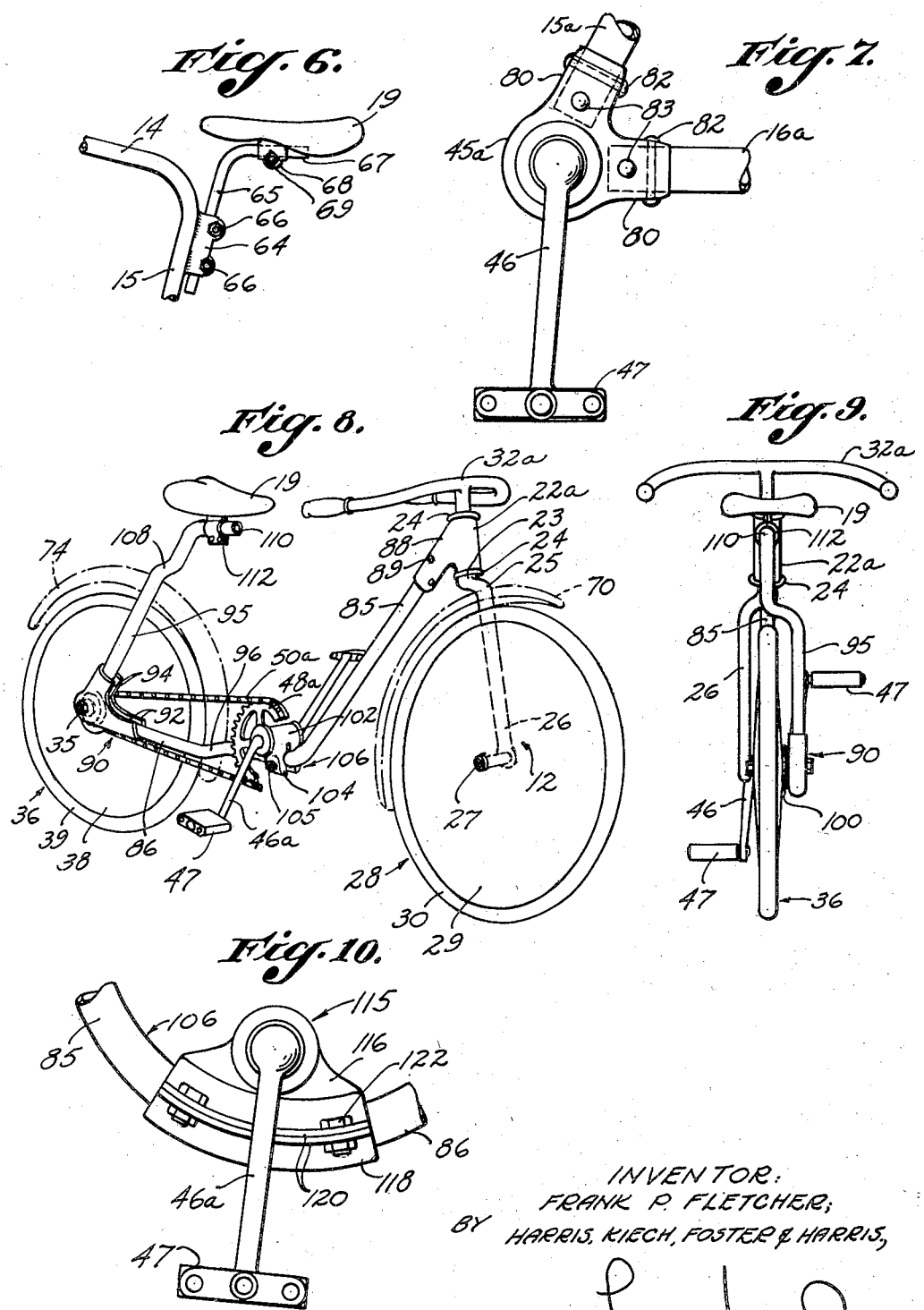

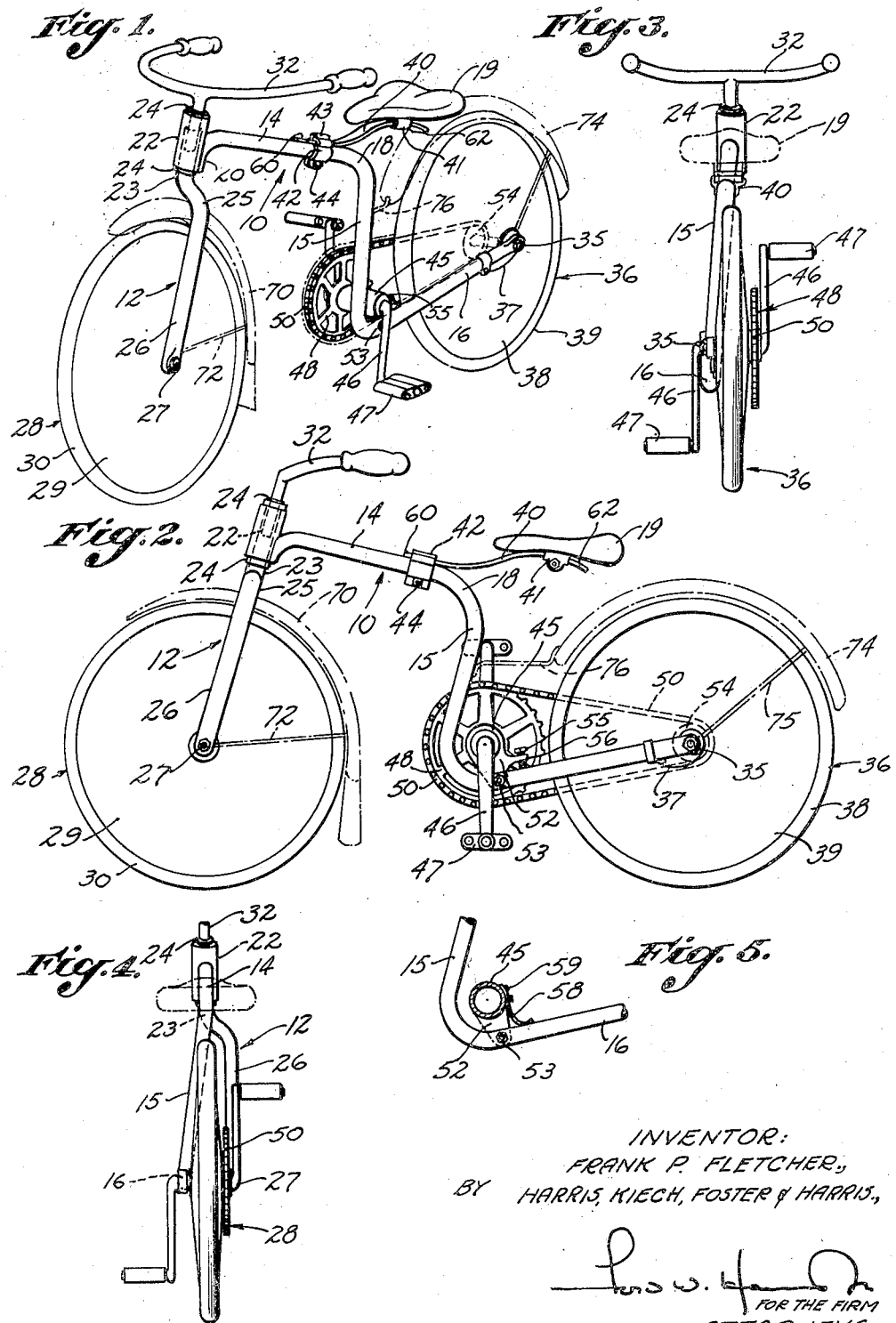

Patented Feb. 14, 1950

2,497,121

UNITED STATES PATENT OFFICE 2,497,121

BICYCLE CONSTRUCTION

Frank P. Fletcher, Pasadena, Calif., assignor to Wendell S. Fletcher, Frank P. Fletcher, and Maurice C. Fletcher, copartners doing business as Fletcher Aircraft, Pasadena, Calif.

Application June 19, 1944, Serial No. 540,971

7 Claims. (Cl. 280—283)

This invention relates to bicycles, and in a more particular respect relates to frame constructions for bicycles.

The prime object of this invention is to provide a bicycle of sprung construction, so as to give an easier riding vehicle. An important aspect is to provide a simple and relatively inexpensive type of construction adaptable to main frame manufacture and to the manufacture of front wheel supporting means.

In conventional bicycle frame constructions, as employed heretofore, a main frame has been employed which required forks for the support and bracing of the rear wheel and a brace member for the forward portion of the main frame. Also, a fork has been conventionally employed for the mounting of the front wheel.

According to this invention, the necessity for such constructions is avoided by using for each principal portion a single length of metal, such as spring tubing of sufficient strength and proper temper for the purpose, whereby simplification of manufacture may be accomplished and cost reduced. Thus, for the construction of the main frame, a single length of spring tubing may be employed for the usual substantially horizontal upper forward section, and, similarly, a single length of spring tubing may be employed for the usual vertical intermediate section, and, likewise, a single length of spring tubing may be used for the lower rearward section which carries the rear wheel. According to one form of the invention, a single length of spring tubing may be shaped to form all three of the mentioned sections in one integral whole whereby to constitute the main frame. Similarly, a single length of metal is employed as the front wheel support instead of the conventional forked construction heretofore used.

Among the objects of the invention are the provision of novel wheel arrangements, novel seat mountings, and novel hanger mountings.

According to one object and feature of the invention, provision for alignment of the front and rear wheels with each other is effected by offsetting the wheel-carrying portion of the front wheel support with respect to the main frame, and so offsetting a portion of the main frame with respect to the front and rear wheel locations that the wheels, when properly mounted, will be aligned. According to one form, the wheels are arranged on the opposite sides of the respective parts of a combination frame which comprises a single length of metal for the front wheel support and a single length of metal for the rear wheel support.

A further object of the invention is to provide a novel seat mounting especially adapted to a construction wherein a single length of metal is used for the main frame as a whole, such seat mounting being adapted for proper positioning of the center of gravity of a loaded bicycle with respect to the front and rear wheels, and especially where such seat mounting is adapted to varying configurations of the main frame.

Thus, the desired object of providing a sprung construction is attained by using stiff spring metal such as stiff spring tubing, and simplicity is obtained by using a single length of tubing to perform each major function, thereby minimizing the number of parts.

In a specific instance, the desired seat mounting is achieved by employing an upstanding section of the main frame of a standard or men's-type frame, the seat mounting being set to provide proper balance and alignment. In another specific instance, a women's type frame or "drop-frame" has a seat-supporting section carried by the rear end of a rear-wheel supporting section, means being provided on such seat support for proper alignment of the seat and suitable disposition of the center of gravity of the bicycle when loaded with a rider.

Other objects and features of the invention will be apparent upon reference to the following specification and accompanying drawings, wherein certain embodiments of the invention are disclosed merely by way of illustration.

In the drawings,

Fig. 1 is a perspective view of one form of bicycle constructed according to the present invention where a single length of material constitutes the main frame;

Fig. 2 is a side elevation thereof;

Fig. 3 is a rear elevation thereof;

Fig. 4 is a rear elevational detail, indicating at the same time a variation in the manner of offset of the rear portion of the main frame;

Fig. 5 is an elevational detail of a modified form of hanger mounting;

Fig. 6 is a side elevational detail of a modified form of seat support;

Fig. 7 is an elevational detail of a modified form of hanger construction for a modified frame arrangement;

Fig. 8 is a perspective view of a further modified form of main frame construction, which provides at the same time a modified wheel arrangement;

Fig. 9 is a rear elevation of the form of Fig. 8; and

Fig. 10 is an elevational detail of a further modification of hanger mounting adaptable especially to the construction of Fig. 8.

The bicycle construction of the form of the invention illustrated in Figs. 1 to 4, inclusive, comprises principally a main frame 10 formed of a single length of sufficiently strong, properly tempered metal tubing, and a front wheel support 12 similarly formed of a single length of strong, properly tempered spring metal tubing, its upper portion being rotatably connected with the forward end of the main frame 10. The main frame 10 comprises an upper forward section 14 which, in the form shown, may be considered as approximately horizontally disposed, a substantially vertical intermediate section 15 whose upper portion is integrally joined to the rear portion of the upper section 14, and a substantially horizontal lower rearward section 16 whose forward portion is integrally joined to the lower portion of the vertical section 15. The region of juncture between the rear portion of the upper section 14 and the upper portion of the vertical section 15 constitutes a seat location 18 for the mounting of a seat or saddle 19.

The forward end of the upper section 14 of the main frame 10 is provided with a short depending portion 20 which is suitably secured, as by welding or riveting, to a generally vertically disposed head or socket 22 adapted to receive the upper portion 23 of the front wheel support 12. The upper portion 23 is rotatably mounted in the head 22 in any suitable manner, as by means of conventional bearings 24 provided at the upper and lower ends of the head 22. Adjacent the lower end of the portion 23 of the front wheel support 12, the latter is offset as indicated at 25, the principal length 26 of the support 12 depending as shown and having its lower extremity provided with an axle 27 which carries a front wheel 28. In the form indicated, the wheel 28 is a disk wheel employing disks 29 provided with an appropriate tire 30, but any other form of wheel construction may be employed if desired. The offset 25 of the support 12 is such as to align the wheel 28 with the vertical axis of the head 22 and to provide for proper alignment with the main frame 10 and associated parts. For the purpose of controlling the front wheel 28, a conventional handlebar construction 32 may be employed which is connected with the upper end 23 of the support 12 in the head 22 in any conventional or desired manner.

The rear end of the lower rearward section 16 of the main frame 10 is provided with an axle 35 for a rear wheel 36, this axle carrying, if desired, a conventional coaster brake (not shown) having a conventionally positioned arm 37 secured to the frame section 16. As in the case of the front wheel 28, the rear wheel 36 may be constructed with disks 38 which carry a suitable tire 39.

The rear portion of the main frame 10 is offset laterally in order that the rear wheel 36 may be aligned with the front wheel 28 and with the axis of the head 22 in which the upper end 23 of the front wheel support 12 rotates. In the construction shown in Fig. 3, this offset is accomplished by extending the main frame 10 rearward at such an angle as to attain the desired relationship. In order to align the saddle 19 with the wheels 28 and 36, the saddle itself is offset somewhat toward the right in order to place its median line in the plane in which the wheels 28 and 36 and the upper portion 23 of the wheel support 12 operate. This mounting of the saddle 19 upon the seat location 18 of the main frame 10 is accomplished by means of an irregularly curved leaf spring 40 to one end of which an adjusting clamp 41 secures the saddle 19, the other end of the leaf spring 40 being clamped to the seat location 18 as by means of a suitably designed offsetting two-piece clamp 42 hinged together at 43 and secured in place by a bolt 44.

Instead of offsetting the saddle 19 and its spring 40 to accomplish proper alignment with the wheels 28 and 36, as shown in Fig. 3, the upper forward section 14 of the main frame 10 may be extended directly rearward in the plane in which the wheels 28 and 36 are disposed, as seen in Fig. 4, the intermediate vertical section 15 being angled downward in order to offset the lower rearward wheel-supporting section 16 for properly positioning the rear wheel 36. Fig. 4 also shows the rear section 16 oppositely offset from the front wheel supporting section 26, thereby placing the front and rear wheels on opposite sides of their supports and facilitating balance.

For the purpose of propulsion of the bicycle, a transverse hanger mounting or bearing 45 is secured in the bend at the junction between the intermediate section 15 and the rearward section 16, which bearing 45 supports a conventional hanger 46 carrying pedals 47, the hanger 46 being also provided with a conventional forward sprocket 48 which actuates a conventional drive chain 50. The hanger bearing 45 is mounted on a swinging bracket 52 pivotally secured at 53 to the adjacent portion of the rearward frame section 16. The chain 50 passes rearward and engages with a conventional small rear sprocket 54 on the axle 35 and propelling the bicycle. The tendency of the forward sprocket 48 to be drawn rearward during operation, is overcome by means of a set screw 55 carried in a lug 56 on the bracket 52, the lower end of the set screw bearing upon the top of the frame section 16. This set screw 55 also serves to tension the chain 50 and take up slack therein. A modification of the means for controlling positioning of the bracket 52 is shown in Fig. 5 where a heavy leaf spring 58 secured at 59 to the bearing 45 is employed, the lower end of the leaf spring 58 bearing upon the adjacent portion of the frame section 16, as indicated, whereby to urge the bearing 45, the hanger 46 and the sprocket 48 forward.

Another important feature particularly adapted for use with the one-piece main frame 10 is the mounting of the saddle 19 and of its supporting spring 40. As shown, the leaf spring 40 is formed on an irregular reverse curve whereby the forward end portion 60, as shown in the drawings, has a given pitch with respect to the intermediate portion, and the rearward end portion 62 is constructed on a long curve, along which the saddle 19 may be adjusted in order to change its pitch. Thus, not only does the spring 40 provide a means for offsetting the saddle 19 to align it with the front and rear wheels 28 and 36 when the main frame 10 is arranged in a single plane as indicated in Fig. 3, but it also provides a means for adjusting the saddle 19 to accommodate various riders. In addition to adjustment of the saddle 19 backward and forward upon the spring 40, which is accomplished by loosening the saddle clamp 41, the spring 40 may be inverted so that, by reversing the spring 40 and inserting the end portion 62 into the spring clamp 42 at any desired position permitted by the curvature of the end portion 62, the elevation of the opposite end portion 60 of the spring 40 may be varied. Again, the height of the saddle 19 may be adjusted merely by turning the spring 40 over from its position as shown in Figs. 1 and 2, the size and curvature of the spring 40 with respect to the size of the saddle 19 being varied as necessary or desirable for any particular proportioning of the individual bicycle construction.

In Fig. 6, there is shown a modified form of seat mounting which is adaptable either to the frame arrangement shown in Figs. 1, 2 and 3, or other frame arrangement shown in Fig. 4. Here, the upright intermediate section 15 carries a clamp 64 welded thereto and adapted to receive a seat post 65 which is bound in a clamp as by means of bolts 66. The seat 19 is secured to an upper rearwardly directed portion 67 of the post 65 as by means of a clamp 68 retained by bolts 69.

Conventional devices may be attached to the bicycle here shown, as indicated by broken lines in Figs. 1 and 2. For example, a front fender 70 may be connected with the axle 27 by an appropriate arm 72, the upper end of the fender 70 being secured to the front wheel support 12 in any desired manner. Similarly, a rear fender 74 may have its rear end supported upon the axle 35 by an arm 75, the forward end being anchored to the intermediate vertical frame section 15 as by means of a supporting finger 76.

From the foregoing description, it will be apparent that a one-piece main frame, as well as a one-piece front wheel support, may be employed in a bicycle construction, these parts being arranged and offset in various manner to secure proper alignment of the front and rear wheels with respect to each other and with respect to the saddle which will support a rider. Thus, when a complete bicycle is properly assembled, the wheels 28 and 36, the axis of the head 22, and the median line of the saddle 19 will all lie in the same operating plane. With the construction of Fig. 4, the upper forward section 14 of the main frame 10 also will lie in that plane. With the construction of both Figs. 3 and 4, the lower frame section 16 which supports the rear wheel 36 will lie preferably in a plane parallel with that in which the wheels 28 and 36 are positioned.

In Fig. 7 there is shown a modification which relates both to the means for mounting the hanger 46 and to the construction of the main frame. Here, instead of shaping the intermediate vertical section 15 and the lower rear wheel supporting section 16 from a single length of tubing, separate lengths of tubing 15a and 16a are employed for construction of the intermediate and rear sections, respectively. The ends of these sections are carried in a hanger mounting 45a in which the usual hanger 46 is journaled in the usual way. The hanger mounting 45a is provided with two integrally cast sockets 80 constructed to receive the ends of the frame sections 15a and 16a, and, in the form shown, the ends of these sections are secured in their respective sockets by means of cross rivets 82 and 83 disposed at right angles in each instance whereby to insure rigid attachment.

In Figs. 8 and 9 a modified form of construction is illustrated which departs from that of Figs. 1 to 3 in at least two respects. In this form, the main frame is constructed to serve the purpose of a so-called "drop-frame" construction heretofore frequently employed for the use of women and girls. Also, in this form, the front wheel-supporting and rear wheel-supporting sections are offset oppositely so as to dispose the front and rear wheels on opposite sides of the resultant combination frame. With this arrangement, the same front wheel support 12, as used with the construction of Figs. 1 to 4, is employed comprising the upper portion 23, the offset 25 and the depending portion 26 supporting the axle 27 which carries the wheel 28 formed with the disks 29 and provided with a tire 30. Here, the same bearings 24 carry a head 22a which corresponds generally with the head 22 of Fig. 1 and is adapted to receive a conventional post of conventional handlebars 32a. In this form, the main frame, which also may be called a "drop-frame," comprises an inclined forward section 85 and an integral lower rear wheel supporting section 86. Thus, a single length of tubing is used to constitute these two sections. The upper end of the section 85 is connected with the head 22a through the medium of a socket 88 integrally secured as by welding to the head 22a, the upper end of the frame section 85 being secured in the socket 88 as by rivets 89, or welding, or both.

The rear end of the lower rear wheel supporting section 86 is equipped to carry the same rear axle 35 and its rear wheel 36 formed with the disks 38 and tire 39, as in the form of Figs. 1 to 4. For this purpose, an angularly shaped bracket 90 is used which is provided with two side walls 92 that are suitably folded around the end portion of the section 86 and rigidly secured thereto, as by welding, in order to constitute a firm support into which the rear end of the section 86 extends a limited distance. The rear portion of the bracket 90 has extensions 94 of the walls 92 which are folded about and rigidly secured to an elongated upstanding frame section 95 which constitutes a seat post carrying the seat 19. As in the case of the rear end of the frame section 86, the seat-supporting section 95 extends a limited distance into the bracket 90 between the side wall extensions 94, so that the elbow of the bracket 90 provides spaced mountings for the axle 35. The spacing of the sides of the bracket 90, and the rigidity thereof, are such as to anchor the axle 35 in sufficiently rigid position to align the rear wheel 36 properly. In order to provide for alignment of the wheel 36 with the front wheel 28, the lower frame section 86 is laterally offset at 96 in a direction opposite to that of the offset 25 of the front wheel support 12. This arrangement of the wheels with respect to the main frame not only aligns the front and rear wheels, as indicated in Fig. 9, but also insures good balance. In order to minimize the tendency to twist during propulsion of the bicycle, a driven sprocket 100 is secured to the wheel 36 closely adjacent the inner walls of the wheel-supporting bracket 90. By a construction similar to the form of Figs. 1 to 4, sprocket 100 is driven by an endless chain 50a from a drive sprocket 48a which is secured to the hanger 46a. In this instance, the hanger 46a is carried in a hanger mounting 102 which is provided, for example, with integral clamping means 104 secured by a clamp bolt 105 at a mounting location formed by the tubing portion 106 at the juncture between the forward frame section 85 and the rear frame section 86. By this arrangement of parts, the offset 96 of the rear frame section 86 lies between the two strands of the chain 50a in a manner somewhat similar to conventional frame construction. The type of clamp shown at 104 is such as to permit sliding of the mounting 102 along the tubing portion 106 in order to adjust the tension of the chain 50a.

In order to properly dispose the center of gravity of the bicycle when the seat 19 carries a rider, the seat-carrying section 95 is offset over the wheel 36, as indicated at 108, and in the same direction as the portion 96 of the rear frame section 86 is offset, whereby the seat 19 may be properly aligned. In the form shown, the upper end 110 of the seat-supporting section 95 is directed forward to provide a mounting for any suitable form of adjustable clamp 112 carried by the seat 19. As in the form of Figs. 1 and 2, the front fender 70 and the rear fender 74 may be provided and secured in any desired manner. Conveniently, the front fender 70 will be mounted as illustrated in Figs. 1 and 2, and the rear fender 74 will have its forward end secured to the offset portion 96 and a rear portion secured to the seat-supporting section 95 adjacent the offset portion 108.

In Fig. 10, there is shown a modified form of hanger mounting 115 to carry the hanger 46a. This mounting comprises a cast portion 116 formed on the arc of a circle and adapted to engage the upper face of the juncture portion 106 of Fig. 8, the portion 106 in this instance being curved accordingly. Cooperating with the casting 116 is a second casting or stamping 118 curved to correspond with curvature of the casting 116. Both of the parts 116 and 118 are shown as provided with flanges 120 which are bolted together by short bolts 122 whereby the parts 116 and 118 are clamped in position. By extending the curvature of the juncture portion 106 of the main frame on a curve sufficiently long, the hanger mounting 115 may be adjusted along the curve for the purpose of in turn adjusting the tension of the chain 50a. Obviously, this same form of hanger mounting may be employed upon the construction of Figs. 1 and 2.

From the foregoing description of Figs. 8 and 9, it will be apparent that a bicycle of a drop-frame type of construction may be employed in which a forward section and a lower rear wheel-supporting section may be constructed from a single length of spring tubing or other sufficiently rigid material, the frame parts being offset to provide proper alignment of the front and rear wheels, and that desired balance may be conveniently obtained by offsetting the front wheel support laterally in one direction and the rear wheel-supporting portion of the main frame laterally in the opposite direction. At the same time, an elongated seat post may be conveniently secured to the rear end of the lower main frame section and offset laterally at its upper end to position and properly align the seat with the wheels. Also, with such construction, the usual driven sprocket may be located between the rear wheel and the framework for the purpose of minimizing the effect of twisting influences.

With respect to all forms, it will be apparent that the use of properly tempered, adequately strong material, such as stiff spring tubing, will not only permit the construction of a main frame and front wheel-supporting means according to this invention, but will also permit the manufacture of an adequately sprung construction which will be conducive to comfortable riding. Thus, with the construction of Figs. 1 and 4, a limited amount of spring action will be found in the length of tubing comprising the upper forward section 14, the intermediate vertical section 15 and the lower rear wheel-supporting section 16. Similarly, in the construction of Figs. 8 and 9, spring action will be found in the forward frame section 85 and the lower rear wheel-supporting section 86. In addition, a limited amount of spring action will be found in the seat-supporting section 95. Thus, in the construction of Figs. 8 and 9, a double spring action will be obtained corresponding in general with a similar spring action found in the construction of Figs. 1 and 2.

While the constructions shown are readily adaptable for producing small bicycles for small children, especially where small disk wheels with hard rubber tires are employed, nevertheless, the principal application of this type of construction is to be found in the manufacture of full-sized bicycles for adults, both of the form of Figs. 1 and 2, which corresponds in general with the standard type of frame, and of the drop-frame type shown in Figs. 8 and 9. Whatever the type or size, bicycles of the present construction are ridden in the same manner and with the same facility as those of the conventional types now commonly used.

It is to be understood that the illustrated forms of the generic invention herein disclosed are presented only by way of example, and that it is intended to protect all such modifications as fall within the scope of the appended claims.

I claim as my invention:

1. In combination in a bicycle construction: a main frame; a seat; an irregularly curved leaf spring adapted to support said seat and to be supported by said frame; means to secure said spring removably to said frame; and means to secure said seat removably to said spring, said spring having an intermediate portion and having end portions which are offset vertically in opposite directions with respect to said intermediate portion, said spring being invertible and reversible end-for-end to vary the elevation of said seat with respect to said frame.

2. As an article of manufacture, a main frame for a bicycle comprising a tubular, substantially S-shaped, single-piece frame including a forward upper section approximately horizontal, a rearward lower section approximately horizontal, and an intermediate section extending downwardly and forwardly and connected to said forward and rearward sections by curved portions, said sections and portions being of spring material so as to provide a resilient frame.

3. In a bicycle, the combination of: a main frame of tubular spring material, including a forward upper section approximately horizontal, a rearward lower section approximately horizontal, and a substantially S-shaped intermediate section extending downwardly and forwardly and connected to said forward and rearward sections; means at the forward end of said forward section adapted to carry a front wheel support; a front wheel carried by said front wheel support; means at the rear end of said rearward section adapted to carry a rear wheel; a rear wheel carried by said last-mentioned means; a rear sprocket secured relative to said rear wheel so as to drive said rear wheel; chain means connected to said rear sprocket; a front sprocket operatively connected to said chain means, said front sprocket being movably secured to said main frame; and resilient means for urging said front sprocket forwardly so that normal springing of said frame between said sprockets does not substantially change the center distances therebetween.

4. In a bicycle construction, the combination of: a main frame; a rear wheel rotatably mounted on said main frame; a driven sprocket connected to said rear wheel; a hanger mounting bracket pivotally connected to said main frame; a rotatable pedal hanger carried by said hanger mounting bracket; a driving sprocket connected to said pedal hanger; a chain trained over said driving and driven sprockets; and resilient adjusting means engaging said hanger mounting bracket and said main frame for urging said hanger mounting bracket forwardly about said pivotal connection thereof to maintain tension in said chain.

5. In a bicycle, the combination of: a main frame formed of a single piece of spring material; front wheel supporting means rotatably mounted on said main frame at the forward end thereof; a front wheel rotatably mounted on said front wheel supporting means; a rear wheel rotatably mounted on said main frame at the rearward end thereof; a driven sprocket connected to said rear wheel; a hanger mounting bracket pivotally connected to said main frame; a rotatable pedal hanger carried by said hanger mounting bracket; a driving sprocket connected to said pedal hanger; a chain trained over said driving and driven sprockets; and resilient adjusting means engaging said hanger mounting bracket and said main frame for urging said hanger mounting bracket forwardly about said pivotal connection thereof to compensate for deflections of said main frame intermediate said driving and driven sprockets so that the distance between said driving and driven sprockets is maintained substantially constant for any deflection of said main frame therebetween.

6. In a bicycle construction, the combination of: a frame; a seat; and an irregularly curved leaf spring for supporting said seat, said spring being releasably connected to said frame and said seat, said spring being provided with an intermediate portion and being provided with end portions which are offset vertically in opposite directions with respect to said intermediate portion, said spring being invertible and reversible end-for-end to vary the position of said seat relative to said frame.

7. In a bicycle, the combination of: a main frame; a driven sprocket rotatably mounted on said main frame; a bracket member carried by said main frame and movable relative thereto toward and away from said driven sprocket; a driving sprocket rotatably mounted on said bracket member; a chain trained over said sprockets; and resilient means engaging said bracket member and said main frame for urging said bracket member and said driving sprocket thereon away from said driven sprocket to maintain tension in said chain.

FRANK P. FLETCHER.

REFERENCES CITED

The following references are of record in the file of this patent:

UNITED STATES PATENTS

| Number | Name | Date |
| --- | --- | --- |
| 87,596 | Stafford | Mar. 9, 1869 |
| 401,237 | Woodward | Apr. 9, 1889 |
| 402,313 | Duryea | Apr. 30, 1889 |
| 439,915 | Weston | Nov. 4, 1890 |
| 459,003 | Hanson | Sept. 8, 1891 |
| 523,115 | Garford | July 17, 1894 |
| 622,066 | Parker | Mar. 28, 1899 |
| 1,580,414 | Cozzolino et al. | Apr. 13, 1926 |
| 1,907,645 | Glaser | May 9, 1933 |
| 2,244,709 | Kinzel | June 10, 1941 |

FOREIGN PATENTS

| Number | Country | Date |
| --- | --- | --- |
| 2,911 | Great Britain | Feb. 17, 1891 |
| 11,777A | Great Britain | May 29, 1897 |
| 20,507 | Great Britain | Nov. 30, 1895 |
| 175,955 | Great Britain | Nov. 1, 1921 |
| 202,170 | Great Britain | Aug. 16, 1923 |
| 241,714 | Great Britain | Oct. 29, 1925 |